US009429960B2

(12) United States Patent
Liu et al.

(10) Patent No.: US 9,429,960 B2
(45) Date of Patent: Aug. 30, 2016

(54) INTEGRATED INFORMATION FRAMEWORK FOR AUTOMATED PERFORMANCE ANALYSIS OF HEATING, VENTILATION, AND AIR CONDITIONING (HVAC) SYSTEMS

(71) Applicant: Carnegie Mellon University, Pittsburgh, PA (US)

(72) Inventors: Xuesong Liu, Pittsburgh, PA (US); Burcu Akinci, Pittsburgh, PA (US); Mario Berges, Pittsburgh, PA (US); James H. Garrett, Jr., Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 546 days.

(21) Appl. No.: 14/019,261

(22) Filed: Sep. 5, 2013

(65) Prior Publication Data

US 2014/0067133 A1    Mar. 6, 2014

Related U.S. Application Data

(60) Provisional application No. 61/743,484, filed on Sep. 5, 2012.

(51) Int. Cl.
| | |
|---|---|
| *G06F 17/30* | (2006.01) |
| *G05D 23/19* | (2006.01) |
| *F24F 11/00* | (2006.01) |
| *G06F 17/50* | (2006.01) |

(52) U.S. Cl.
CPC ............ *G05D 23/19* (2013.01); *F24F 11/0086* (2013.01); *G06F 17/5004* (2013.01); *F24F2011/0061* (2013.01); *F24F 2011/0091* (2013.01); *F24F 2011/0094* (2013.01); *G06F 2217/80* (2013.01)

(58) Field of Classification Search
CPC ............ G06F 17/5004; G06F 2217/80; F24F 11/0086; F24F 2011/0091; F24F 2011/0094; F24F 2011/0061; G05D 23/19

USPC ...... 700/3, 276; 705/304, 305; 707/822, 602
See application file for complete search history.

(56) References Cited

U.S. PATENT DOCUMENTS

| | | | |
|---|---|---|---|
| 5,481,481 A * | 1/1996 | Frey ................... | G05B 19/0421 340/3.1 |
| 7,406,436 B1 * | 7/2008 | Reisman ............... | G06Q 30/02 705/7.32 |

(Continued)

OTHER PUBLICATIONS

Huang, W. et al., "Using fenetic algorithms to optimize controller parameters for HVAC systems", 1997 Elseiver Science S.A., Energy and Buildings 26 (1997), pp. 277-282.*

*Primary Examiner* — Shahid Alam
(74) *Attorney, Agent, or Firm* — Fish & Richardson P.C.

(57) ABSTRACT

A computer-implemented method includes, in one aspect, retrieving HVAC system information; converting the retrieved HVAC system information from one or more first data formats to a second data format; storing the converted HVAC system information; identifying first portions of the stored HVAC system information that pertain to a particular component; and generating one or more associations among the identified, first portions of the stored HVAC system information; receiving a request for HVAC system information that is used by a performance analysis algorithm; determining a type of component of the HVAC system that is related to the requested HVAC system information; and identifying one or more items of the stored HVAC system information that is of the requested HVAC system information; and transmitting the identified one or more items of the stored HVAC system information for use in execution of the performance analysis algorithm.

16 Claims, 6 Drawing Sheets

(56) References Cited

U.S. PATENT DOCUMENTS

2010/0318400 A1* 12/2010 Geffen ................ G06Q 30/016
 705/304

2012/0022700 A1* 1/2012 Drees ..................... G05B 15/02
 700/276
2013/0191185 A1* 7/2013 Galvin ................... G06Q 30/01
 705/7.37

* cited by examiner

INTEGRATED INFORMATION FRAMEWORK FOR AUTOMATED PERFORMANCE ANALYSIS OF HEATING, VENTILATION, AND AIR CONDITIONING (HVAC) SYSTEMS

CROSS-REFERENCE TO RELATED APPLICATIONS

This application claims the benefit of priority under 35 U.S.C. §119(e) to provisional U.S. Patent Application No. 61/743,484, filed on Sep. 5, 2012, the entire contents of which are hereby incorporated by reference.

STATEMENT REGARDING FEDERALLY-SPONSORED RESEARCH AND DEVELOPMENT

This invention was made with government support under the National Institute of Standards and Technology Grant 60NANB8D8140. The government has certain rights in the invention.

FIELD OF USE

The present disclosure relates to integrating information for performance analysis of Heating, Ventilation, and Air Conditioning (HVAC) systems.

BACKGROUND

Buildings may account for about 40% of the total energy consumption and 38% of carbon dioxide emissions in the United States. Approximately 40% of the total energy consumed in both residential and commercial buildings may be used by Heating, Ventilation, and Air Conditioning (HVAC) systems. 10% to 40% of the energy used by the HVAC systems may be wasted due to faults, such as biased or drifted sensors, malfunctioning controllers, stuck dampers, and fouled coils. This waste in energy accounts for $36 billion to $60 billion every year in the United States. Increasing energy efficiency of HVAC systems may directly reduce utility costs for building owners, and may play a role in achieving sustainable environment. Many computerized approaches and algorithms have been developed to automatically and continuously analyze conditions of HVAC systems. However, the complex information required by these algorithms may pose a challenge in deploying them in real-world facilities.

SUMMARY

The present disclosure describes methods and systems relating to integrating information for analyzing and improving performance of Heating, Ventilation, and Air Conditioning (HVAC) systems. The information integration system may acquire, integrate, and manage design and operational information about a building and HVAC systems within the building. The information integration system may integrate information from heterogeneous data models and embedded sensors and controllers in the HVAC systems. The information integration system may support multiple performance analysis and improvement algorithms that monitor, analyze, and improve performance of the HVAC systems. To support the multiple performance analysis and improvement algorithms, the information integration system may formalize a query mechanism that can retrieve the information required by the algorithms. The information integration system may facilitate deployment of the algorithms in different buildings and HVAC systems, which may reduce energy consumption of HVAC systems, enable proactive maintenance and repair of HVAC components, and improve the comfort level of building occupants.

In one aspect of the present disclosure, a computer-implemented method includes retrieving, from one or more external data repositories, heating, ventilation, and air conditioning (HVAC) system information about an HVAC system; converting the retrieved HVAC system information from one or more first data formats to a second data format; storing the converted HVAC system information in a data repository; for a particular component of the HVAC system, identifying first portions of the stored HVAC system information that pertain to the particular component; and generating, in the data repository, one or more associations among the identified, first portions of the stored HVAC system information; receiving a request for HVAC system information that is used by a performance analysis algorithm to analyze a performance of the HVAC system; in response to the request, determining, based on contents of the request, a type of component of the HVAC system that is related to the requested HVAC system information; and identifying, in the data repository, one or more items of the stored HVAC system information that is of the requested HVAC system information, with identification of the requested HVAC system information being at least partly based on associations among second portions of the stored HVAC system information that pertain to the determined type of component; and transmitting the identified one or more items of the stored HVAC system information to a client device for use in execution of the performance analysis algorithm.

Implementations of the disclosure can include one or more of the following features. The retrieved HVAC system information comprises dynamic information indicative of one or more of a sensor reading and a control signal, and wherein the dynamic information is collected from a control network of the HVAC system. The retrieved HVAC system information comprises a first instance of a data class that is associated with the particular component and a second instance of the data class that is associated with the particular component. Generating the one or more associations among the identified, first portions of the stored HVAC system information comprises combining the first and second instances into a single instance of the data class; and storing the single instance of the data class in the data repository. Receiving the request comprises receiving input that defines a query for the performance analysis algorithm from a user. The method further comprises transmitting, to the client device, information for a graphical user interface that when rendered on the client device enables user selection of one or more performance analysis algorithms. Receiving the request for the HVAC system information that is used by the performance analysis algorithm to analyze the performance of the HVAC system comprises receiving information indicative of a user selection of at least one of the one or more performance analysis algorithms. The method further comprises receiving analysis results from execution of the performance analysis algorithm; and generating information for a graphical user interface that presents the received analysis results to a user.

In another aspect of the present disclosure, a computer-implemented method includes collecting system information about the HVAC system, with the system information comprising configuration information collected using the plurality of data models, wherein a first one of the plurality of data models uses a first data structure and a first data format to represent at least a portion of the configuration information, a second one of the plurality of data models uses a second data structure and a second data format to represent another portion of the configuration information, the first data structure differs from the second data structure, the first data format differs from the second data format, and at least two data models of the plurality of data models include an instance of a data class that represents a particular component of the HVAC system; generating an integrated data model of the collected system information, with the integrated data model using a common structure and a common data format to represent the collected system information, with the integrated data model using a single instance of the data class to represent the particular component of the HVAC system, and with the integrated data model using a control loop data structure to represent components in a control loop of the HVAC system, the control loop data structure including instances of data classes that represent the components in the control loop, and with the control loop data structure specifying functional relationships among the components in the control loop; receiving information indicative of a selection of a performance analysis algorithm from the plurality of performance analysis algorithms, the received information specifying components of the HVAC system and functional relationships among the components; and identifying, in the integrated data model, information required for execution of the selected performance analysis algorithm, with the identified information being at least partly based on a correspondence among (i) one or more of the functional relationships among the components that are specified in the received information, and (ii) one of more of the functional relationships among the components in the control loop.

All or part of the foregoing may be implemented as a computer program product including instructions that are stored on one or more non-transitory machine-readable storage media, and that are executable on one or more processing devices. All or part of the foregoing may be implemented as an apparatus, method, or electronic system that may include one or more processing devices and memory to store executable instructions to implement the stated functions.

The details of one or more implementations are set forth in the accompanying drawings and the description below. Other features, objects, and advantages will be apparent from the description, the drawings, and the claims.

DETAILED DESCRIPTION

Figure 1:
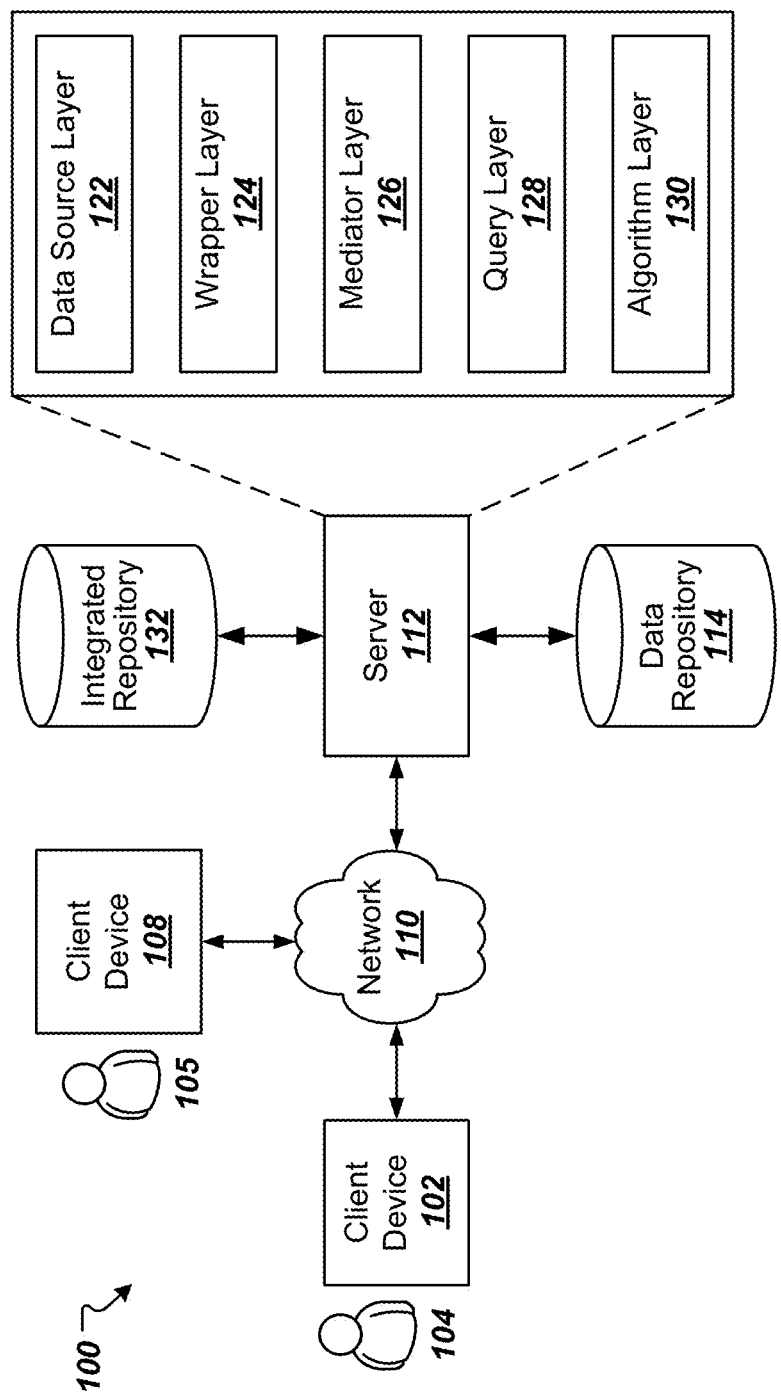
FIG. 1 is a block diagram of an example of a network environment for integrating information for analyzing and improving performance of HVAC systems.

The present disclosure describes systems and methods related to acquiring and integrating information from multiple data models and providing the integrated information to multiple performance analysis and improvement algorithms for HVAC systems. Performance analysis and improvement algorithms, such as fault detection and diagnosis (FDD), and automated commissioning and operating schedule optimization, have been developed to address challenges associated with manual assessment and improvement of the performance of HVAC systems. The algorithms may analyze the performance of HVAC systems using information about configuration of the systems and condition of the indoor environment, and using a variety of approaches, such as statistical analysis, artificial intelligence, expert knowledge, and energy simulation.

To utilize the energy saving potential of these algorithms, an integrated framework may be used to facilitate the process of collecting, integrating, and providing information required by the algorithms developed for the HVAC systems. Performance analysis and improvement algorithms for these systems require information such as sensor readings, building layout and materials, load requirements, and configurations of HVAC systems. The algorithms may require a large amount of complex information about the building and its systems to analyze the conditions of the HVAC systems. Actively detecting faults in an HVAC system may require collecting contextual information about a building in which the HVAC system is installed and continuously monitoring and analyzing the status of hardware and software components that are part of the HVAC system. Examples of such information may include dynamic sensing measurements and control signals, the configuration and specification of the HVAC subsystems and components, properties of the building elements, and the layout, materials, and load requirements of the building.

Although performance analysis and improvement algorithms may facilitate improvements in energy efficiency of HVAC systems, manually collecting and integrating the information and deploying the algorithms in real-world facilities may be challenging. HVAC systems may include hundreds of components that continuously generate measurements and control signals. The design information about the building and the HVAC systems may be generated and managed using a variety of software applications due to the involvement of engineers from multiple disciplines, such as architecture, mechanical engineering, and electrical engineering.

The software applications generating and managing the design information may use standard or proprietary data models. A data model describes the semantics of objects and the relevant relationships and constraints in a domain. Data models used by the software applications may include Industry Foundation Classes (IFC), Green Building XML (gbXML), and EnergyPlus input data file. IFC is a standard data model that provides a semantically rich way to represent information about building elements. Engineers from multiple disciplines, such as architecture, construction, mechanical engineering, and structural engineering, can use the same schema to share and exchange data models with each other. gbXML is an open data model that represents the information needed to analyze building energy performance.

Its schema contains information about the thermal properties of building elements and the configurations of HVAC and lighting systems. EnergyPlus is a software application for performing whole-building energy simulation. Although it is not a standard, it is one of the most widely used software applications for modeling and analyzing heating, cooling, ventilation and water use in buildings. Its input data file uses key-value pairs to represent detailed configuration information of HVAC systems and their components.

A single data model may not represent all information required by the performance analysis and improvement algorithms for HVAC systems, and thus multiple data models may be used to represent the information required by the performance analysis and improvement algorithms. The information integration system may acquire and integrate information from the data models and the sensors and controllers embedded in the HVAC systems to support the information requirements of the performance analysis and improvement algorithms. The information integration system may formalize a query mechanism that represents the information needs of different algorithms and retrieves the required information.

By facilitating the process of deploying multiple performance analysis and improvement algorithms in different buildings and HVAC systems, the information integration system may enable the utilization of energy saving potential provided by the algorithms. It also provides a platform that enables users to plug-and-play various algorithms so that they can evaluate the different combinations of the algorithms.

FIG. 1 is a block diagram of an example of a network environment 100 for acquiring and integrating information from data models and providing the information to performance analysis and improvement algorithms. Network environment 100 includes client devices 102 and 108, network 110, server 112, and data repository 114.

The client device 102 is used by a user 104, such as an engineer. The user 104 may use the client device 102 to manage information about a building and HVAC systems within the building. The client device 102 sends the building and HVAC systems information to the server 112. The server 112 may store the building and HVAC systems information in a data repository 114.

The client device 108 is used by user 105, such as a facilities manager. The client device 108 may receive information about a building and HVAC systems in the building and performance analysis and improvement results. The client device 108 may present the information and results to the user 105 on a display device of the client device 108.

The server 112 is a system for integrating building and HVAC systems information represented by various data models and providing the integrated information to performance analysis and improvement algorithms. The server 112 may retrieve building and HVAC systems information from the data repository 114. The server 112 may integrate the information from the data repository 114 and provide the information to the algorithms using an integrated framework that includes a data source layer 122, a wrapper layer 124, a mediator layer 126, a query layer 128, an algorithm layer 130, and an integrated repository 132.

Figure 2:
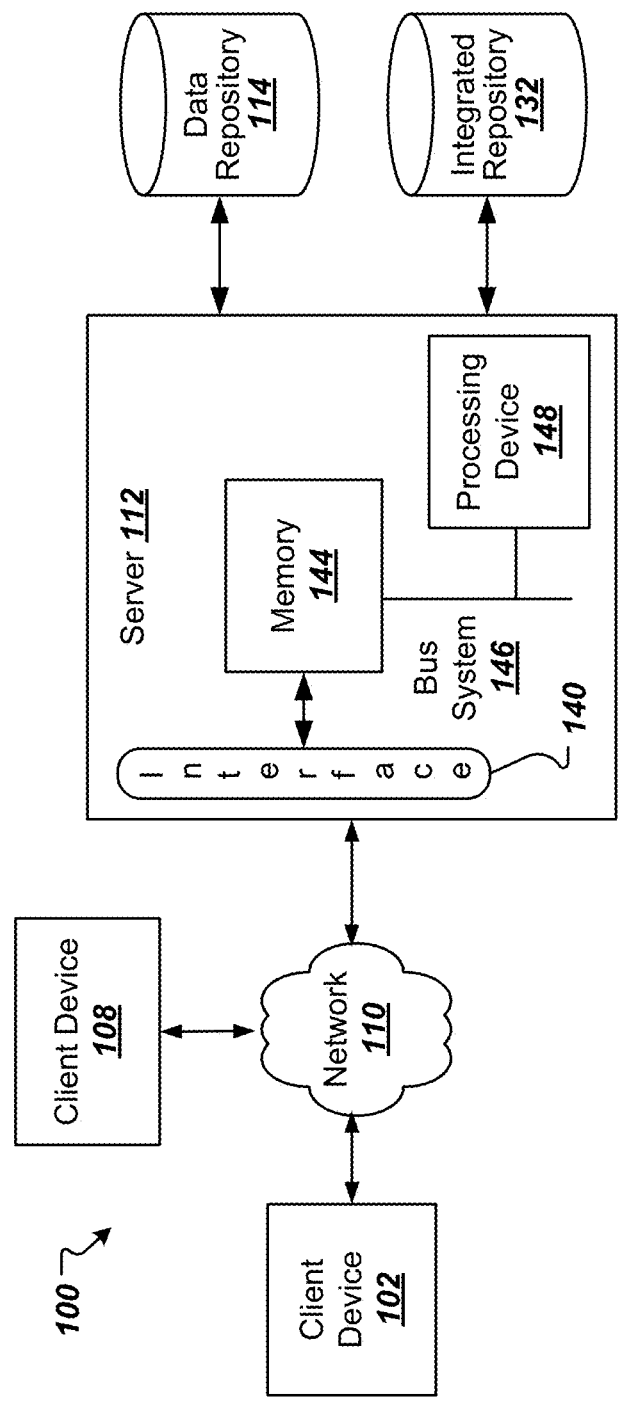
FIG. 2 is a block diagram of examples of components of the network environment of FIG. 1.

FIG. 2 is a block diagram of examples of components of the network environment 100 of FIG. 1. In FIG. 2, the client devices 102 and 108 can be any sort of computing devices capable of taking input from a user and communicating over network 110 with server 112 and/or with other client devices. For example, the client devices 102 and 108 can be mobile devices, desktop computers, laptops, cell phones, personal digital assistants ("PDAs"), servers, embedded computing systems, and so forth.

Server 112 can be any of a variety of computing devices capable of receiving data, such as a server, a distributed computing system, a desktop computer, a laptop, a cell phone, a rack-mounted server, and so forth. Server 112 may be a single server or a group of servers that are at a same location or at different locations.

The illustrated server 112 can receive data from the client devices 102 and 108 via input/output ("I/O") interface 140. I/O interface 140 can be any type of interface capable of receiving data over a network, such as an Ethernet interface, a wireless networking interface, a fiber-optic networking interface, a modem, and so forth. Server 112 also includes a processing device 148 and memory 144. A bus system 146, including, for example, a data bus and a motherboard, can be used to establish and to control data communication between the components of server 112.

The illustrated processing device 148 may include one or more microprocessors. Generally, processing device 148 may include any appropriate processor and/or logic that is capable of receiving and storing data, and of communicating over a network (not shown). Memory 144 can include a hard drive and a random access memory storage device, such as a dynamic random access memory, or other types of non-transitory machine-readable storage devices. Memory 144 stores computer programs (not shown) that are executable by processing device 148 to perform the techniques described herein.

Figure 3:
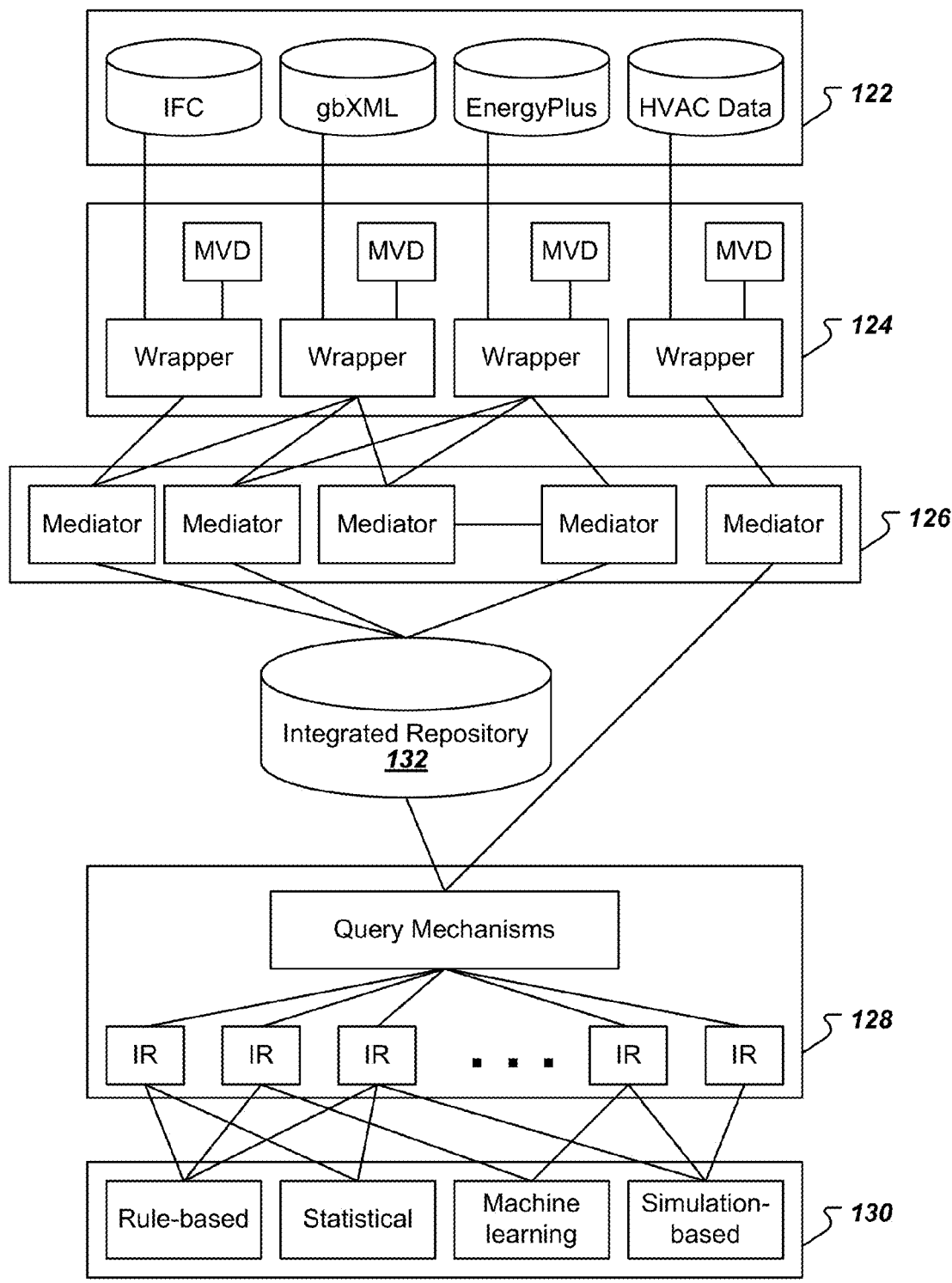
FIG. 3 is a block diagram of the integrated framework for acquiring, integrating, managing, and providing the information required by the performance analysis and improvement algorithms for HVAC systems.

FIG. 3 is a block diagram of the integrated framework for acquiring, integrating, managing, and providing the information required by the performance analysis and improvement algorithms for HVAC systems. Because new algorithms that require new types of information items may be continuously developed, an attribute of the integrated framework is extensibility, which may be promoted by the layered architecture of the integrated framework. Components in each layer can be added or modified without impacting the whole application.

The layers of the integrated framework include the data source layer 122, the wrapper layer 124, the mediator layer 126, the query layer 128, the algorithm layer 130, and the integrated repository 132. The data source layer 122 and the algorithm layer 130 may be internal or external to the system implementing the other layers.

The data source layer 122 contains the sources of information that are integrated by the framework. In some implementations, the information may be represented using three data models, e.g., IFC, gbXML, and EnergyPlus, to provide the configuration information of buildings and HVAC systems. The dynamic HVAC data, such as sensor readings and control signals, are acquired directly from the HVAC system using a standard communication protocol. In some implementations, the dynamic HVAC data may be acquired through a Building Automation and Control Network (BACnet).

The wrapper layer 124 contains a set of wrappers, which are software procedures that are developed to retrieve data from a specific data source. A data source is either a data model or the control network of an HVAC system. Different data models use various structures and formats to represent the data. For example, IFC uses an object-oriented modeling approach to specify the structures of classes, properties, and relationships. gbXML uses a hierarchical structure and the XML language to define the elements and properties. EnergyPlus uses key-value pairs to represent the types of objects and their properties. The wrapper layer 124 of the integrated framework includes one wrapper for each data model to parse the specific format and structure used by the data model.

Figure 4:
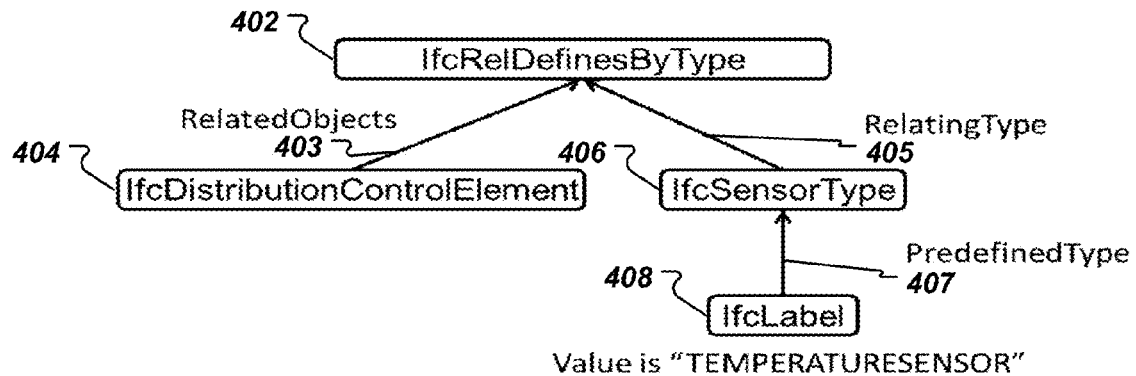
FIG. 4 shows a representation of a temperature sensor in an IFC data model.

FIG. 4 shows a representation of a temperature sensor in an IFC data model, e.g., an IFC 2x3 data model. The representation of the temperature sensor includes four classes IfcRelDefinesByType 402, IfcDistributionControlElement 404, IfcSensorType 406, and IfcLabel 408. The representation of the temperatures sensor includes three properties RelatedObjects 403, RelatingType 405, and PredefinedType 407. To retrieve the objects representing temperature sensors from the IFC data model, instances of the four classes 402, 404, 406, 408 and the three properties 403, 405, 407 need to be accessed.

Returning to FIG. 3, a Model-View-Definition (MVD) approach may be used to formalize a language for retrieving data from the data models using their wrappers and for representing information requirements of the algorithms. The MVD approach provides a formal process to specify the mappings between the data models and the information requirements of the algorithms. The wrappers process the MVDs to derive the information requirements of the algorithms and retrieve the information from the data models.

An example of a MVD for the representation of the temperature sensors depicted in FIG. 4 is shown below. The MVD is implemented using the SPARQL Protocol and RDF Query Language (SPARQL) to formalize a language that can represent the mappings between information requirements and multiple data models.

```
Select ?element
Where{
    ?relType rdfs:ClassOf IfcRelDefinesByType
    ?relType.RelatedObjects rdfs:SubClassOf
    IfcDistributionControlElement
    ?relType.RelatingType rdfs:SubClassOf IfcSensorType
    ?relType.RelatingType.PredefinedType =
    "TEMPERATURESENSOR"
    ?element list:member ?relType.RelatedObjects
}
```

The statement "?relType rdfs:ClassOf IfcRelDefinesByType" identifies all instances of the IfcRelDefinesByType class 402. Using the identified instances, the statement "?relType.RelatedObjects rdfs:SubClassOf IfcDistributionControlElement" identifies instances whose properties Related Objects 403 contains instances of the IfcDistributionControlElement class 404. Using the instances whose properties Related Objects 403 contains instances of the IfcDistributionControlElement class 404, the statement "?relType.RelatingType rdfs:SubClassOf IfcSensorType" identifies instances whose property RelatingType 405 contains instances of the IfcSensorType class 406. Using the instances whose property RelatingType 405 contains instances of the IfcSensorType class 406, the statement "?relType.RelatingType.PredefinedType= 'TEMPERATURESENSOR'" identifies instances whose property RelatingType 405 has the property PredefinedType 407, which has value as "TEMPERATURESENSOR". Using the instances whose property RelatingType 405 has the property PredefinedType 407, the statement "?element list:member ?relType.RelatedObjects" retrieves all the instances contained in their RelatedObjects property 403.

Returning to FIG. 3, the mediator layer includes a set of mediators that are software procedures that map and integrate information items retrieved by the wrappers from the different information sources of the data source layer 122. Because different data models contain different types of information with various levels of details, the information items retrieved by the wrappers need to be matched and integrated. Integrating heterogeneous data models may include schema-centric integration and data-centric integration. Schema-centric integration compares and matches the schema elements, such as classes, properties, and relationships, of different data models. Data-centric integration matches and integrates the instances that are stored in different data models but represent the same real-world objects.

Because different data models may each include instances that represent the same real-world objects, multiple instances of the same object may be acquired from the data models. For example, in the IFC schema, the class IfcPump represents pumps, while in the EnergyPlus data model, the type Pump defines the information about pumps. If a building has 10 pumps, both the IFC data model and the EnergyPlus data model will each have 10 instances of pumps. 100 pairs of matches between the two data models may be possible. Data-centric integration addresses the question of how to match each pump instance in the IFC data model to its corresponding pump instance in the EnergyPlus data model.

Since HVAC components work together in different groups to serve control functions, their functional relationships can assist in the integration of instances. For example, instances of a sensor that measures the zone temperature can be differentiated from the same type of sensor that measures the supply air temperature. A semi-automated approach, referred to as integrating data models with domain structures (IDMDS), uses functional relationships of HVAC components to match and integrate instances in different data models. The IDMDS approach formalizes an ontology to represent the domain structures of functional groups in HVAC systems. The mediators process the domain structures and use them to match the data items from different data models. If new types of HVAC components or functional groups are needed, users can use the ontology to add new domain structures that will be automatically handled by the mediators. The integrated framework may provide a user interface for defining a domain structure. The user interface may include a guided template with the predefined classes, properties, and relationships so that a user can select components and define relationships between the components to generate the domain structure.

Figure 5:
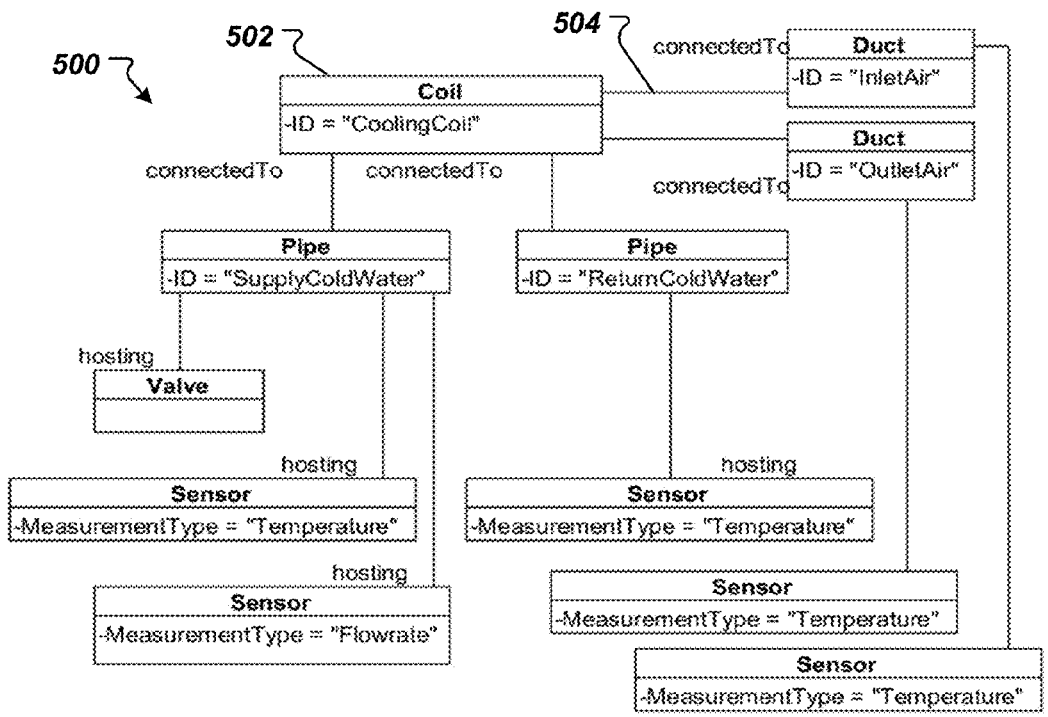
FIG. 5 shows an example of an instance diagram of a domain structure for a cooling coil.

FIG. 5 shows an example of an instance diagram 500 of a domain structure for a cooling coil. The instance diagram 500 may be implemented in unified modeling language (UML). The instance diagram 500 includes nodes, such as node 502, that represent an HVAC component, and links, such as link 504, that represent a functional relationship between HVAC components.

The integrated information may be managed under a materialized view or a virtual view. The materialized view retrieves and stores the information required by the algorithms. The virtual view retrieves information required by the algorithms directly from the information sources without storing the information. The materialized view requires the stored data to be updated when the data from the data sources change, but reduces the frequency of accessing the information sources. The virtual view directly retrieves the latest data from each source and does not require an additional repository. However, if the speed to access the data sources is low, the efficiency of the virtual view may be directly impacted.

In the integrated framework of FIG. 3, the virtual view may be used to handle the dynamic data from the HVAC systems, and the materialized view may be used to manage the static information from the data models. The integrated repository 132 may be used to store the static information from the data models and to store an integrated data model. The integrated data model may use classes, properties, and relationships to represent the concepts of the information requirements of the algorithms.

The integrated framework includes a query layer 128. The query layer 128 may include a library of query mechanisms that can parse queries, interpret contextual information, derive functional relationships, and retrieve needed information from the integrated repository 132. Different performance analysis algorithms have various information requirements (IR). To derive the required information, the algorithms may be represented as formal statements, referred to as queries. A query represents the contextual information that characterizes the information requirements (IR).

For example, a rule-based algorithm may be represented by a query for "the flow rate of the cold water supplied to the cooling coil of the AHU that serves the space with the given ID". The query indicates that the information needed is the water flow rate. The remaining part of the query is the contextual information. The first piece of contextual information is a property (e.g., ID) of an object (e.g., space). The second piece of contextual information is a functional relationship that is specific in the HVAC domain. The third piece of contextual information uses the composition of a HVAC functional component. The fourth piece of contextual information is a topological relationship between the pipe and coil. The fifth piece of contextual information is a specific function of the sensing components in HVAC systems.

Queries may use functional relationships among HVAC components to represent the contextual information. In the above query, the second, third, fourth, and fifth pieces of contextual information use functional relationships of HVAC components. To derive the contextual information and retrieve the required information, a query language may be developed to formally represent the building and HVAC objects and their functional relationships. Users can use the integrated framework to define the queries for each performance analysis algorithm. The integrated framework may provide a user interface for defining queries. The user interface may include a guided template with the predefined classes, properties, and relationships so that users can select the needed information items to describe the information requirements of the algorithms. The integrated framework generates query statements and narratives based on the user's description of the information requirements.

The algorithm layer 130 contains the implementations of the performance analysis and improvement algorithms. The algorithms directly interact with the query layer 128 of the integrated framework. The algorithms may be implemented using any suitable operating systems and programming languages. The data communication between the query layer 128 and the algorithms can be handled using any suitable interfacing approach, such as web services or databases.

Figure 6:
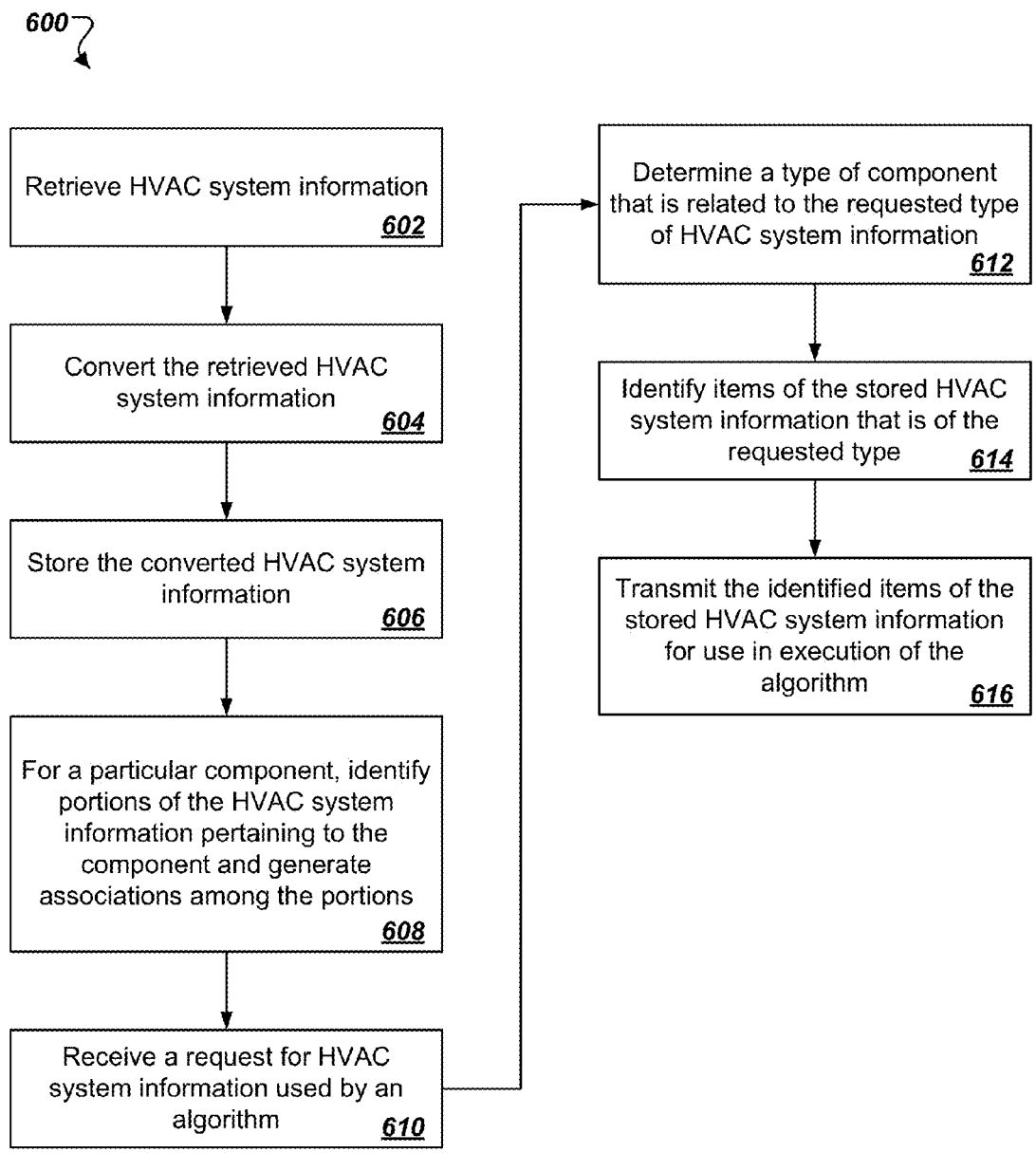
FIG. 6 is a flowchart of an example of a process for acquiring, integrating, managing, and providing the information required by the performance analysis and improvement algorithms for HVAC systems.

FIG. 6 is a flowchart of an example of a process 600 for acquiring, integrating, managing, and providing the information required by the performance analysis and improvement algorithms for HVAC systems. The process 600 may be performed by an information integration system of one or more computers, such as server 122 of FIGS. 1 and 2. The process 600 may include details that have been discussed above with reference to FIGS. 1-5.

The information integration system retrieves HVAC system information about a HVAC system (602). The HVAC system information may be retrieved from one or more external data repositories. The retrieved HVAC system information may include dynamic information indicative of a sensor reading, a control signal, or both. The dynamic information may be collected from a control network of the HVAC system. The retrieved HVAC system information may include a first instance of a data class that is associated with a particular component and a second instance of the data class that is associated with the particular component.

The information integration system converts the retrieved HVAC system information from one or more first data formats to a second data format (604). The information integration system stores the converted HVAC system information in a data repository (606).

For a particular component of the HVAC system, the information integration system identifies portions of the stored HVAC system information that pertain to the particular component, and generates, in the data repository, one or more associations among the identified, portions of the stored HVAC system information (608). Generating the one or more associations among the identified, first portions of the stored HVAC system information may include combining the first and second instances into a single instance of the data class, and storing the single instance of the data class in the data repository.

The information integration system receives a request for HVAC system information that is used by a performance analysis algorithm to analyze a performance of the HVAC system (610). Receiving the request may include receiving input that defines a query for the performance analysis algorithm from a user.

In response to receiving the request, the information integration system determines, based on contents of the request, a type of component of the HVAC system that is related to the requested type of HVAC system information (612), and identifies, in the data repository, items of the stored HVAC system information that is of the requested type (614). Identification of the requested type of HVAC system information may be at least partly based on associations among second portions of the stored HVAC system information that pertain to the determined type of component. The information integration system transmits the identified one or more items of the stored HVAC system information to a client device for use in execution of the performance analysis algorithm (616).

Figure 7:
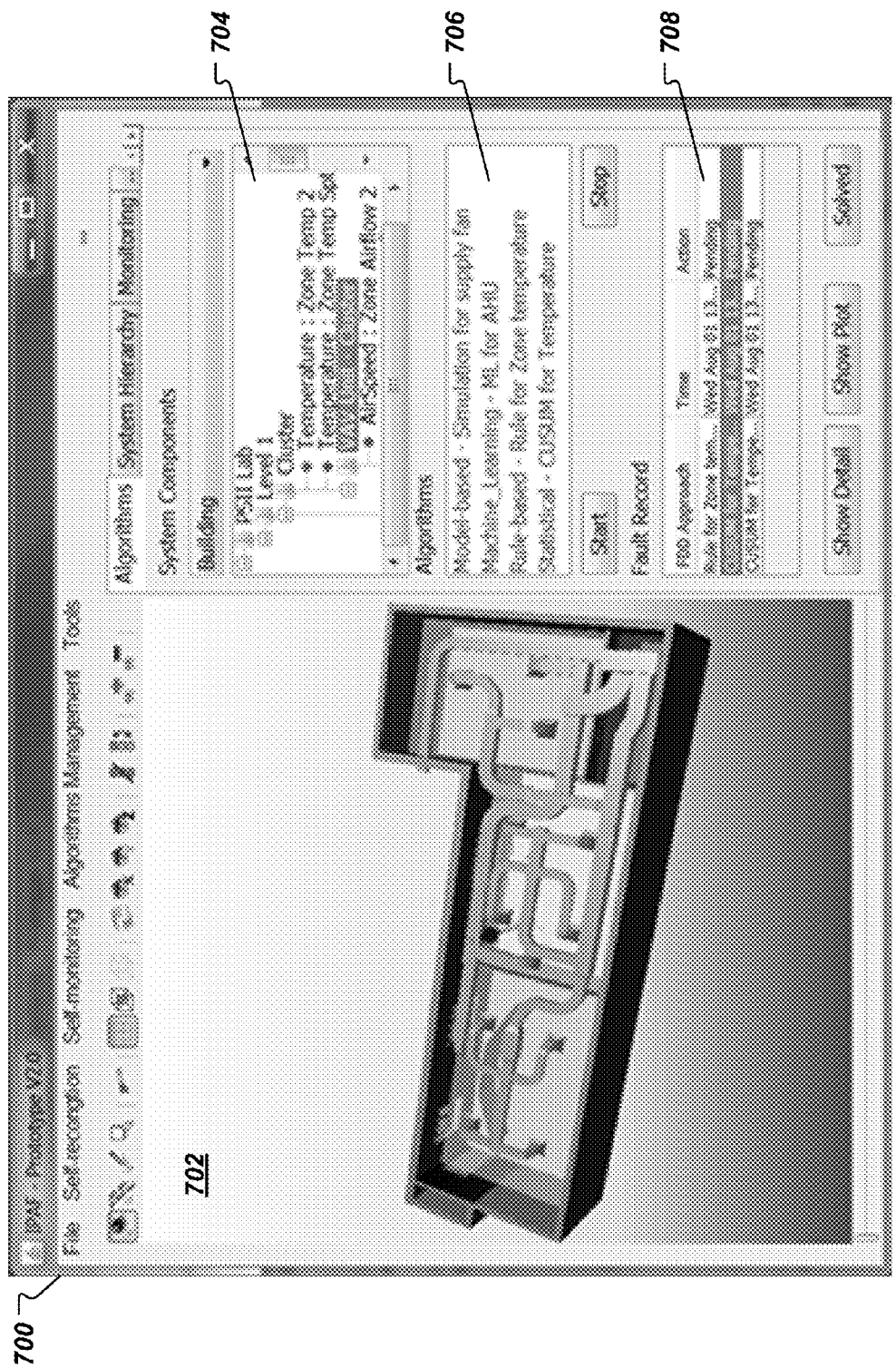
FIG. 7 shows an example of a graphical user interface for presenting information about the building and HVAC systems and results generated by the algorithms.

FIG. 7 shows an example of a graphical user interface (GUI) 700 for presenting information about the building and HVAC systems and results generated by the algorithms. The GUI 700 includes a building and HVAC system viewer 702, a system components hierarchy 704, an algorithms list 706, and a fault record 708.

The building and HVAC system viewer 702 may provide a three dimensional representation of the building and the HVAC systems within the building. Different portions of the building and the HVAC systems may be color coded to show, for example, temperature readings. The viewer 702 may provide users with the ability to quickly locate the components and compare the condition and performance of different components spatially.

The system components hierarchy 704 displays a list of HVAC systems managed by the integrated framework. The system components hierarchy 704 may arrange the HVAC systems in the hierarchy based on functional relationships between the components of the systems. A user can select a HVAC component or system to be analyzed via the system components hierarchy 704.

The algorithms list 706 displays a list of available performance analysis and improvement algorithms. A user can select one or more algorithms to be executed to analyze performance of the selected HVAC components or systems.

The fault record 708 displays a message log. When an algorithm generates a message, the integrated framework raises an alarm dialog and stores the message in a log. The message may include information such as the time the message was generated and the related components. When a message is highlighted, the GUI 700 may highlight the related components in the components hierarchy 704 and may provide a plot dialog to show the historical data that are relevant to the message.

Embodiments can be implemented in digital electronic circuitry, or in computer hardware, firmware, software, or in combinations thereof. An apparatus can be implemented in a computer program product tangibly embodied or stored in a machine-readable storage device for execution by a programmable processor; and method actions can be performed by a programmable processor executing a program of instructions to perform functions by operating on input data and generating output. The embodiments described herein, and other embodiments of the invention, can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object oriented programming language, or in assembly or machine language if desired; and in any case, the language can be a compiled or interpreted language.

Processors suitable for the execution of a computer program include, by way of example, both general and special purpose microprocessors, and any one or more processors of any kind of digital computer. Generally, a processor will receive instructions and data from a read-only memory or a random-access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Computer readable media for embodying computer program instructions and data include all forms of non-volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in special purpose logic circuitry. Any of the foregoing can be supplemented by, or incorporated in, ASICs (application-specific integrated circuits).

To provide for interaction with a user, embodiments can be implemented on a computer having a display device, e.g., a LCD (liquid crystal display) monitor, for displaying data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments can be implemented in a computing system that includes a back end component, e.g., as a data server, or that includes a middleware component, e.g., an application server, or that includes a front end component, e.g., a client computer having a graphical user interface or a Web browser through which a user can interact with an implementation of embodiments, or any combination of such back end, middleware, or front end components. The components of the system can be interconnected by any form or medium of digital data communication, e.g., a communication network. Examples of communication networks include a local area network (LAN) and a wide area network (WAN), e.g., the Internet.

The system and method or parts thereof may use the "World Wide Web" (Web or WWW), which is that collection of servers on the Internet that utilize the Hypertext Transfer Protocol (HTTP). HTTP is a known application protocol that provides users access to resources, which may be data in different formats such as text, graphics, images, sound, video, Hypertext Markup Language (HTML), as well as programs. Upon specification of a link by the user, the client computer makes a TCP/IP request to a Web server and receives data, which may be another Web page that is formatted according to HTML. Users can also access other pages on the same or other servers by following instructions on the screen, entering certain data, or clicking on selected icons. It should also be noted that any type of selection device known to those skilled in the art, such as check boxes, drop-down boxes, and the like, may be used for embodiments using web pages to allow a user to select options for a given component. Servers run on a variety of platforms, including UNIX machines, although other platforms, such as Windows 2000/2003, Windows NT, Windows 7, Windows 8, Sun, Linux, and Macintosh may also be used. Computer users can view data available on servers or networks on the Web through the use of browsing software, such as Firefox, Netscape Navigator, Microsoft Internet Explorer, or Mosaic browsers. The computing system can include clients and servers. A client and server are generally remote from each other and typically interact through a communication network. The relationship of client and server arises by virtue of computer programs running on the respective computers and having a client-server relationship to each other.

Other embodiments are within the scope and spirit of the description claims. Additionally, due to the nature of software, functions described above can be implemented using software, hardware, firmware, hardwiring, or combinations of any of these. Features implementing functions may also be physically located at various positions, including being distributed such that portions of functions are implemented at different physical locations. The use of the term "a" herein and throughout the application is not used in a limiting manner and therefore is not meant to exclude a multiple meaning or a "one or more" meaning for the term "a." Additionally, to the extent priority is claimed to a provisional patent application, it should be understood that the provisional patent application is not limiting but includes examples of how the techniques described herein may be implemented.

A number of exemplary embodiments of the invention have been described. Nevertheless, it will be understood by one of ordinary skill in the art that various modifications may be made without departing from the spirit and scope of the invention.

What is claimed is:

1. A computer-implemented method comprising:
retrieving, from one or more external data repositories, heating, ventilation, and air conditioning (HVAC) system information about an HVAC system;
converting the retrieved HVAC system information from one or more first data formats to a second data format;
storing the converted HVAC system information in a data repository;
for a particular component of the HVAC system,
identifying first portions of the stored HVAC system information that pertain to the particular component; and
generating, in the data repository, one or more associations among the identified, first portions of the stored HVAC system information;
receiving a request for HVAC system information that is used by a performance analysis algorithm to analyze a performance of the HVAC system;
in response to the request,
determining, based on contents of the request, a type of component of the HVAC system that is related to the requested HVAC system information; and
identifying, in the data repository, one or more items of the stored HVAC system information that is of the requested HVAC system information, with identification of the requested HVAC system information being at least partly based on associations among second portions of the stored HVAC system information that pertain to the determined type of component;
transmitting, to a client device, the identified one or more items of the stored HVAC system information for use in execution of the performance analysis algorithm and information for a graphical user interface that when rendered on the client device enables user selection of one or more performance analysis algorithms;
receiving analysis results from execution of a performance analysis algorithm; and
generating information for a graphical user interface that presents the received analysis results to a user.

2. The computer-implemented method of claim 1, wherein
the retrieved HVAC system information comprises dynamic information indicative of one or more of a sensor reading and a control signal, and wherein the dynamic information is collected from a control network of the HVAC system.

3. The computer-implemented method of claim 1, wherein the retrieved HVAC system information comprises a first instance of a data class that is associated with the particular component and a second instance of the data class that is associated with the particular component, and
wherein generating the one or more associations among the identified, first portions of the stored HVAC system information comprises:
combining the first and second instances into a single instance of the data class; and
storing the single instance of the data class in the data repository.

4. The computer-implemented method of claim 1, wherein receiving the request comprises:
receiving input that defines a query for the performance analysis algorithm from a user.

5. The computer-implemented method of claim 1, wherein receiving the request for the HVAC system information that is used by the performance analysis algorithm to analyze the performance of the HVAC system comprises:
receiving information indicative of a user selection of at least one of the one or more performance analysis algorithms.

6. A computer-implemented method for providing information from a plurality of data models to a plurality of performance analysis algorithms that analyze performance for a heating, ventilation, and air conditioning (HVAC) system, the method comprising:
collecting system information about the HVAC system, with the system information comprising configuration information collected using the plurality of data models, wherein a first one of the plurality of data models uses a first data structure and a first data format to represent at least a portion of the configuration information, a second one of the plurality of data models uses a second data structure and a second data format to represent another portion of the configuration information, the first data structure differs from the second data structure, the first data format differs from the second data format, and at least two data models of the plurality of data models include an instance of a data class that represents a particular component of the HVAC system;
generating an integrated data model of the collected system information, with the integrated data model using a common structure and a common data format to represent the collected system information, with the integrated data model using a single instance of the data class to represent the particular component of the HVAC system, and with the integrated data model using a control loop data structure to represent components in a control loop of the HVAC system, the control loop data structure including instances of data classes that represent the components in the control loop, and with the control loop data structure specifying functional relationships among the components in the control loop;
receiving information indicative of a selection of a performance analysis algorithm from the plurality of performance analysis algorithms, the received information specifying components of the HVAC system and functional relationships among the components;
identifying, in the integrated data model, information required for execution of the selected performance analysis algorithm, with the identified information being at least partly based on a correspondence among (i) one or more of the functional relationships among the components that are specified in the received information, and (ii) one of more of the functional relationships among the components in the control loop;
accessing analysis results from execution of the selected performance analysis algorithm; and
generating information for a graphical user interface that presents the received analysis results to a user.

7. A system comprising:
one or more processing devices; and
one or more computer-readable media storing instructions that are executable by the one or more processing devices to perform operations comprising:
retrieving, from one or more external data repositories, heating, ventilation, and air conditioning (HVAC) system information about an HVAC system;

converting the retrieved HVAC system information from one or more first data formats to a second data format;

storing the converted HVAC system information in a data repository;

for a particular component of the HVAC system,
identifying first portions of the stored HVAC system information that pertain to the particular component; and
generating, in the data repository, one or more associations among the identified, first portions of the stored HVAC system information;

receiving a request for HVAC system information that is used by a performance analysis algorithm to analyze a performance of the HVAC system;

in response to the request,
determining, based on contents of the request, a type of component of the HVAC system that is related to the requested HVAC system information; and
identifying, in the data repository, one or more items of the stored HVAC system information that is of the requested HVAC system information, with identification of the requested HVAC system information being at least partly based on associations among second portions of the stored HVAC system information that pertain to the determined type of component;

transmitting, to a client device, the identified one or more items of the stored HVAC system information for use in execution of the performance analysis algorithm and information for a graphical user interface that when rendered on the client device enables user selection of one or more performance analysis algorithms;

receiving analysis results from execution of a performance analysis algorithm; and generating information for a graphical user interface that presents the received analysis results to a user.

8. The system of claim 7, wherein
the retrieved HVAC system information comprises dynamic information indicative of one or more of a sensor reading and a control signal, and wherein the dynamic information is collected from a control network of the HVAC system.

9. The system of claim 7, wherein the retrieved HVAC system information comprises a first instance of a data class that is associated with the particular component and a second instance of the data class that is associated with the particular component, and
wherein generating the one or more associations among the identified, first portions of the stored HVAC system information comprises:
combining the first and second instances into a single instance of the data class; and
storing the single instance of the data class in the data repository.

10. The system of claim 7, wherein receiving the request comprises:
receiving input that defines a query for the performance analysis algorithm from a user.

11. The system of claim 7,
wherein receiving the request for the HVAC system information that is used by the performance analysis algorithm to analyze the performance of the HVAC system comprises:
receiving information indicative of a user selection of at least one of the one or more performance analysis algorithms.

12. One or more non-transitory computer-readable media storing instructions that are executable by one or more processing devices to perform operations comprising:
retrieving, from one or more external data repositories, heating, ventilation, and air conditioning (HVAC) system information about an HVAC system;
converting the retrieved HVAC system information from one or more first data formats to a second data format;
storing the converted HVAC system information in a data repository;
for a particular component of the HVAC system,
identifying first portions of the stored HVAC system information that pertain to the particular component; and
generating, in the data repository, one or more associations among the identified, first portions of the stored HVAC system information;
receiving a request for HVAC system information that is used by a performance analysis algorithm to analyze a performance of the HVAC system;
in response to the request,
determining, based on contents of the request, a type of component of the HVAC system that is related to the requested HVAC system information; and
identifying, in the data repository, one or more items of the stored HVAC system information that is of the requested HVAC system information, with identification of the requested HVAC system information being at least partly based on associations among second portions of the stored HVAC system information that pertain to the determined type of component;
transmitting, to a client device, the identified one or more items of the stored HVAC system information for use in execution of the performance analysis algorithm and information for a graphical user interface that when rendered on the client device enables user selection of one or more performance analysis algorithms;
receiving analysis results from execution of a performance analysis algorithm; and
generating information for a graphical user interface that presents the received analysis results to a user.

13. The one or more non-transitory computer-readable media of claim 12, wherein
the retrieved HVAC system information comprises dynamic information indicative of one or more of a sensor reading and a control signal, and wherein the dynamic information is collected from a control network of the HVAC system.

14. The one or more non-transitory computer-readable media of claim 12, wherein the retrieved HVAC system information comprises a first instance of a data class that is associated with the particular component and a second instance of the data class that is associated with the particular component, and
wherein generating the one or more associations among the identified, first portions of the stored HVAC system information comprises:
combining the first and second instances into a single instance of the data class; and
storing the single instance of the data class in the data repository.

15. The one or more non-transitory computer-readable media of claim 12, wherein receiving the request comprises:
    receiving input that defines a query for the performance analysis algorithm from a user.

16. The one or more non-transitory computer-readable media of claim 12,
    wherein receiving the request for the HVAC system information that is used by the performance analysis algorithm to analyze the performance of the HVAC system comprises:
        receiving information indicative of a user selection of at least one of the one or more performance analysis algorithms.

* * * * *